(12) United States Patent
Lin et al.

(10) Patent No.: US 9,331,519 B2
(45) Date of Patent: May 3, 2016

(54) PROTECTING DEVICE FOR ELECTRONIC DEVICE

(71) Applicant: Primax Electronics Ltd., Neihu, Taipei (TW)

(72) Inventors: Chih-Hung Lin, Taipei (TW); Jing-Ing Guo, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 209 days.

(21) Appl. No.: 14/019,210

(22) Filed: Sep. 5, 2013

(65) Prior Publication Data

US 2014/0306651 A1  Oct. 16, 2014

(30) Foreign Application Priority Data

Apr. 12, 2013  (TW) .............................. 102206699 U

(51) Int. Cl.
*H02J 7/00* (2006.01)
*H02J 7/02* (2016.01)
*G06F 1/16* (2006.01)

(52) U.S. Cl.
CPC ............... *H02J 7/025* (2013.01); *G06F 1/1632* (2013.01); *G06F 2200/1633* (2013.01)

(58) Field of Classification Search
CPC .............................. H02J 7/0042; H02J 7/0054
USPC ......................................................... 320/108
See application file for complete search history.

(56) References Cited

U.S. PATENT DOCUMENTS

| | | | |
|---|---|---|---|
| 8,891,800 B1* | 11/2014 | Shaffer | 381/384 |
| 2006/0274493 A1* | 12/2006 | Richardson et al. | 361/683 |
| 2007/0247793 A1* | 10/2007 | Carnevali | 361/681 |
| 2012/0169276 A1* | 7/2012 | Wang et al. | 320/108 |
| 2013/0265702 A1* | 10/2013 | Merenda | 361/679.01 |
| 2014/0021909 A1* | 1/2014 | Klawon et al. | 320/108 |
| 2014/0085815 A1* | 3/2014 | Filipovic et al. | 361/679.56 |
| 2014/0103789 A1* | 4/2014 | Cox, III | 312/280 |
| 2014/0128132 A1* | 5/2014 | Cox, III | 455/575.8 |
| 2014/0160025 A1* | 6/2014 | Natarajan | 345/168 |
| 2014/0218305 A1* | 8/2014 | Beasley et al. | 345/169 |
| 2014/0233181 A1* | 8/2014 | Harms et al. | 361/679.56 |
| 2014/0284226 A1* | 9/2014 | Chen | 206/37 |
| 2015/0373448 A1* | 12/2015 | Shaffer | 320/108 |

* cited by examiner

*Primary Examiner* — Suchin Parihar
(74) *Attorney, Agent, or Firm* — Kirton McConkie; Evan R. Witt

(57) ABSTRACT

A protecting device for an electronic device is provided. The protecting device includes a casing, an energy storage element, and a second accommodating part. The casing has a first accommodating part for accommodating the electronic device. The second accommodating part is disposed in the casing for accommodating a peripheral component. The energy storage element is disposed within the casing, and electrically connected with the first accommodating part and the second accommodating part. When the electronic device is accommodated within the first accommodating part, electric power is transmitted from the energy storage element to the electronic device. When the peripheral component is accommodated within the second accommodating part, electric power is transmitted from the energy storage element to the peripheral component.

7 Claims, 9 Drawing Sheets

PROTECTING DEVICE FOR ELECTRONIC DEVICE

FIELD OF THE INVENTION

The present invention relates to a protecting device, and more particularly to a protecting device for an electronic device.

BACKGROUND OF THE INVENTION

With the increasing development of science and technology, a variety of commercially-available electronic devices are developed toward small size, light weightiness and easy portability. Consequently, these electronic devices can be easily carried. Generally, the electronic device has a touch screen. Via the touch screen, the user may input commands into the electronic device in order to control the electronic device. For example, the electronic device is a smart phone, a tablet personal computer, a personal digital assistant or a handheld game console. However, since the light and slim electronic device can only withstand a small impact, the touch screen of the electronic device is readily damaged. If the touch screen of the electronic device is damaged, the operability of the electronic device is deteriorated. In other words, it is very important to protect the electronic device.

On the other hand, the electronic device usually has a built-in chargeable battery for providing electric power to operate the electronic device. In case that the electricity quantity of the chargeable battery of the electronic device is insufficient, the user may open the electronic device by hand and replace the chargeable battery with a new one. Consequently, the electronic device can acquire electric power again. However, many commercially-available electronic devices (e.g. iPhone or iPad) are unable to be opened by hand, and need to be opened by tools. For providing electric power to the electronic device, a power cable should be employed. After a first end of the power cable is connected with a power supply source (e.g. a power socket) and a second end of the power cable is plugged into the electronic device, the electric power may be transmitted from the power supply source to the chargeable battery of the electronic device through the power cable. However, if the power supply source is not available in some places, the power cable fails to be connected to the power supply source. Recently, a portable power source that is easily carried has been disclosed. The portable power source is used for storing electric energy. After the portable power source is electrically connected with the electronic device through the power cable, the electronic device is charged by the portable power source. However, after the portable power source is electrically connected with the electronic device, if the power cable between the portable power source and the electronic device is carelessly pulled by the user, the electrical connection between the portable power source and the electronic device is interrupted.

For solving the above two drawbacks, a conventional accommodating device for an electronic device is introduced into the market. FIG. 1 schematically illustrates the relationship between an accommodating device, a protecting device and a portable power source according to the prior art. In FIG. 1, the accommodating device 1, the protecting device 10 and the portable power source 20 are shown. The accommodating device 1 comprises a first casing 11 and a second casing 12. The first casing 11 comprises plural adjusting grooves 111 and a receiving bag 112. The plural adjusting grooves 111 are formed in a surface of the first casing 11. The receiving bag 112 is used for accommodating the portable power source 20.

The second casing 12 comprises a fixing element 121. The fixing element 121 is disposed on a surface of the second casing 12. When the fixing element 121 is connected with a fixing hole 101 of the protecting device 10, the protecting device 10 is fixed on the second casing 12.

Hereinafter, the operations of the accommodating device 1, the protecting device 10 and the portable power source 20 will be illustrated with reference to FIGS. 1 and 2. FIG. 2 is a schematic perspective view illustrating the operations of the accommodating device, the protecting device and the portable power source as shown in FIG. 1. In addition to the accommodating device 1, the protecting device 10 and the portable power source 20, an electronic device 30 is further shown in FIG. 2. The protecting device 10 is used for partially covering the electronic device 30, wherein a display screen 301 of the electronic device 30 is exposed outside. The display screen 301 is a touch screen. When the user wants to use the electronic device 30, the protecting device 10 is fixed on the second casing 12 of the accommodating device 1 through the connection between the fixing element 121 and the fixing hole 101. In addition, the accommodating device 1 is placed on a desk surface. Next, according to the practical requirements, the protecting device 10 is inserted into any adjusting groove 111 of the plural adjusting grooves 111. Consequently, an included angle is formed between the display screen 301 and the desk surface. Under this circumstance, the display screen 301 can be easily viewed by the user, or the electronic device 30 can be operated in a touch control manner.

In case that the electricity quantity of a chargeable battery (not shown) of the electronic device 30 is insufficient, a power cable 201 is used to the electronic device 30 and the portable power source 20, which is accommodated within the receiving bag 112. Consequently, electric power can be transmitted from the portable power source 20 to the electronic device 30 through the power cable 201 in order to charge the chargeable battery of the electronic device 30. After the electronic device 30 is no longer used, the protecting device 10 may be fixed on the accommodating device 1, and the portable power source 20 may be accommodated within the accommodating device 1. Under this circumstance, the accommodating device 1 is in an accommodated status, and thus the electronic device 30 and the portable power source 20 can be easily carried. After the electronic device 30 is no longer used and the accommodating device 1 is in the accommodated status, the electronic device 30 can still be charged by the portable power source 20. Since the portable power source 20 is accommodated within the receiving bag 112, the possibility of carelessly pulling out the power cable 201 will be minimized.

However, although the portable power source 20 is accommodated within the receiving bag 112, the portable power source 20 may still be dropped off from the receiving bag 112. Under this circumstance, the power cable 201 is possibly pulled out, and thus the charging operation is interrupted. In other words, the accommodating device 1 for the electronic device needs to be further improved.

SUMMARY OF THE INVENTION

The present invention provides a protecting device for an electronic device to prevent interruption of the charging operation while minimizing the possibility of carelessly pulling out the connecting wires.

The present invention also provides a protecting device for an electronic device, in which a portable power source is integrated into the protecting device.

In accordance with an aspect of the present invention, there is provided a protecting device for an electronic device. The protecting device includes a casing, a first electrical connection component, a second accommodating part, a second electrical connection component, and an energy storage element. The casing is used for partially covering the electronic device. The casing has a first accommodating part for accommodating the electronic device. When the electronic device is accommodated within the first accommodating part, a display screen of the electronic device is exposed outside. The first electrical connection component is disposed within the first accommodating part. When the first electrical connection component is contacted with the electronic device, the first electrical connection component is electrically connected with the electronic device. The second accommodating part is disposed in the casing for accommodating a peripheral component. The second electrical connection component is disposed within the second accommodating part. When the second electrical connection component is contacted with the peripheral component, the second electrical connection component is electrically connected with the peripheral component. The energy storage element is disposed within the casing, and connected with the first electrical connection component and the second electrical connection component for providing electric power to the first electrical connection component or the second electrical connection component. When the peripheral component is accommodated within the second accommodating part, the electric power is transmitted from the energy storage element to the peripheral component through the second electrical connection component.

In accordance with another aspect of the present invention, there is provided a protecting device for an electronic device. The protecting device includes a casing, an energy storage element, a second accommodating part, and a wireless charging module. The casing is used for partially covering the electronic device. The casing has a first accommodating part for accommodating the electronic device. When the electronic device is accommodated within the first accommodating part, a display screen of the electronic device is exposed outside. The energy storage element is disposed within the casing for providing electric power. The second accommodating part is disposed in the casing for accommodating a peripheral component. The wireless charging module is connected with the energy storage element. In response to the electric power, the electronic device within the first accommodating part is wirelessly charged by the wireless charging module, or the peripheral component within the second accommodating part is wirelessly charged by the wireless charging module. When the peripheral component is accommodated within the second accommodating part, the peripheral component is wirelessly charged by the wireless charging module.

In accordance with a further aspect of the present invention, there is provided a protecting device for an electronic device. The protecting device includes a casing, an energy storage element, a second accommodating part, a first electrical connection component, and a wireless charging module. The casing is used for partially covering the electronic device. The casing has a first accommodating part for accommodating the electronic device. When the electronic device is accommodated within the first accommodating part, a display screen of the electronic device is exposed outside. The energy storage element is disposed within the casing for providing electric power. The second accommodating part is disposed in the casing for accommodating a peripheral component. The first electrical connection component is disposed within the second accommodating part. When the first electrical connection component is contacted with the peripheral component, the first electrical connection component is electrically connected with the peripheral component. The wireless charging module is connected with the energy storage element. In response to the electric power, the electronic device within the first accommodating part is wirelessly charged by the wireless charging module. When the peripheral component is accommodated within the second accommodating part, the electric power is transmitted to the peripheral component through the first electrical connection component.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For eliminating the drawbacks from the prior art, the present invention provides a protecting device for an electronic device.

Figure 1:
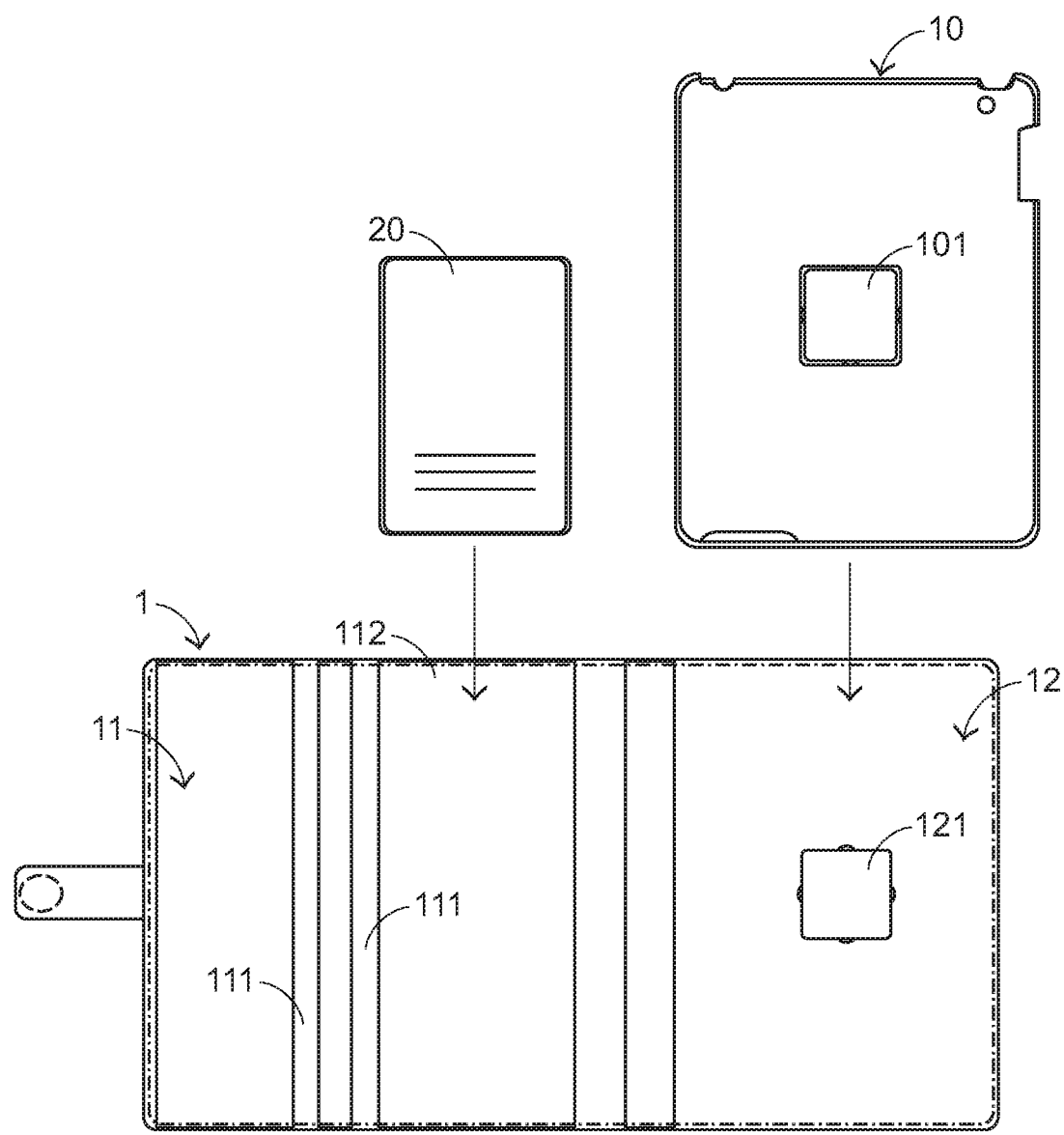
FIG. 1 schematically illustrates the relationship between an accommodating device, a protecting device and a portable power source according to the prior art.
Figure 2:
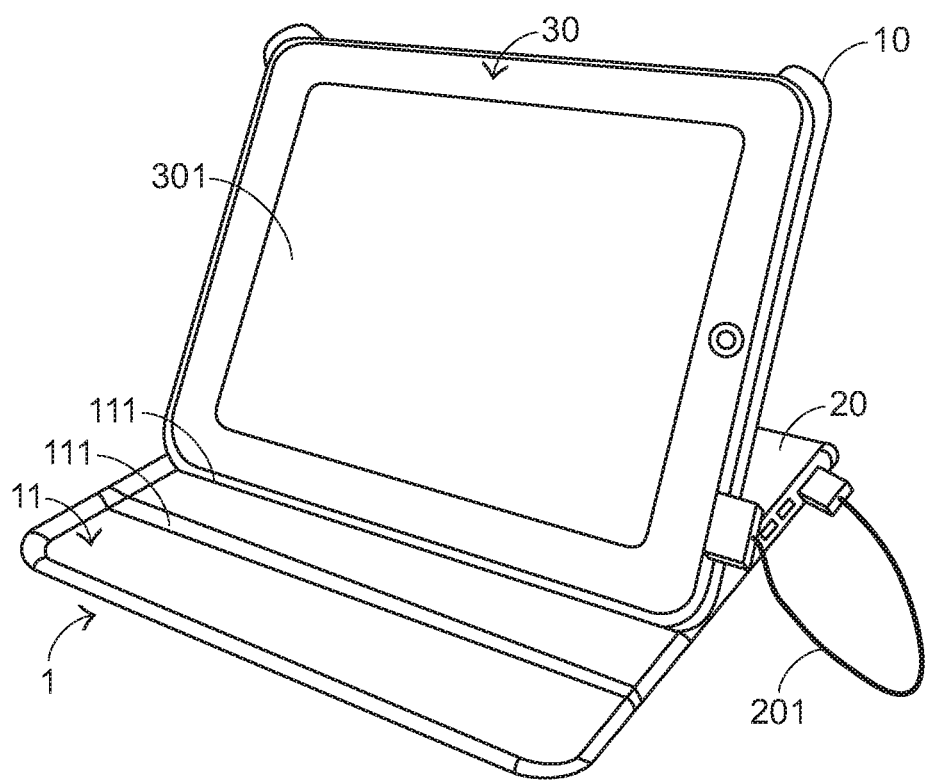
FIG. 2 is a schematic perspective view illustrating the operations of the accommodating device, the protecting device and the portable power source as shown in FIG. 1.
Figure 3:
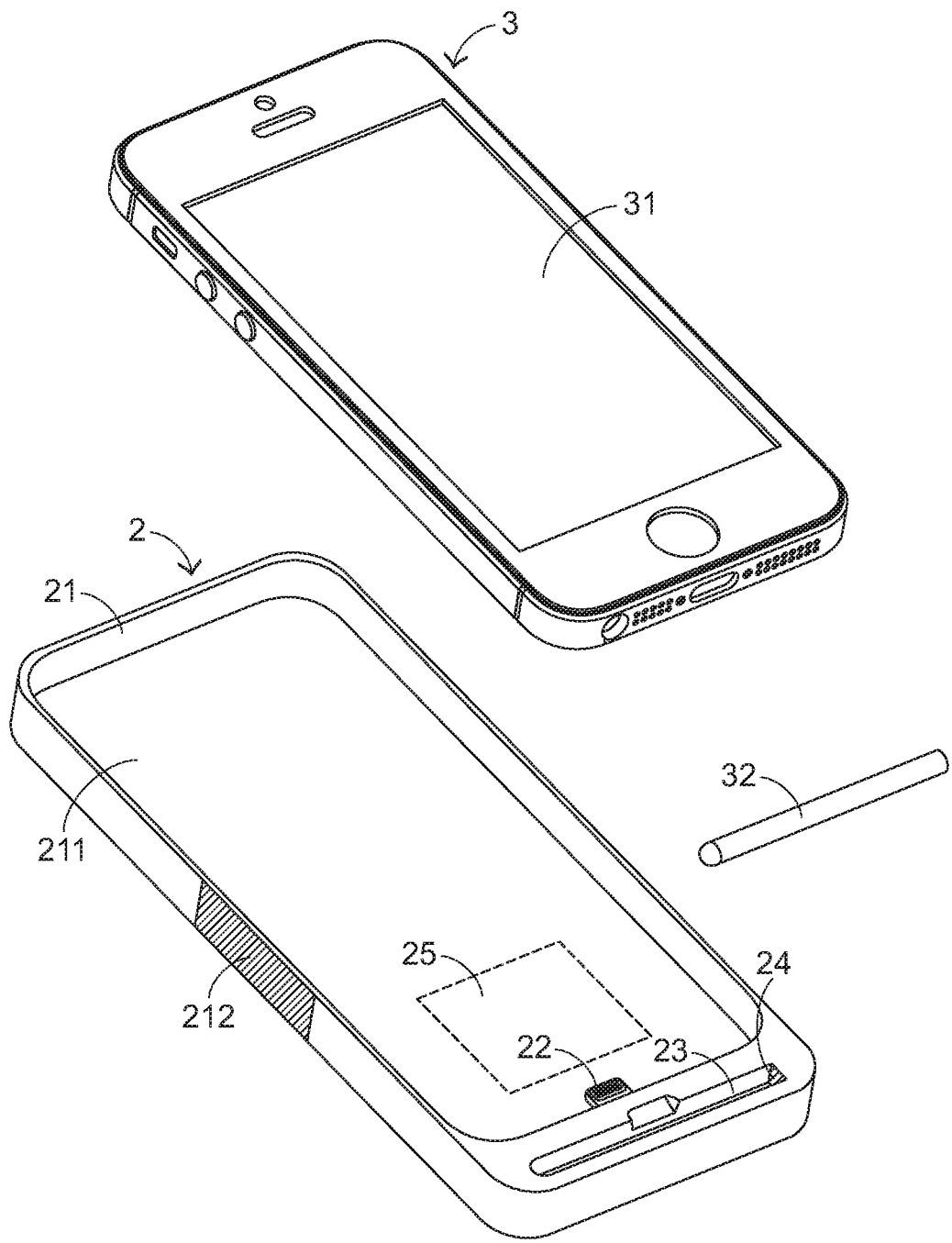
FIG. 3 is a schematic exploded view illustrating the relationship between a protecting device, an electronic device and a peripheral component according to a first embodiment of the present invention.
Figure 4:
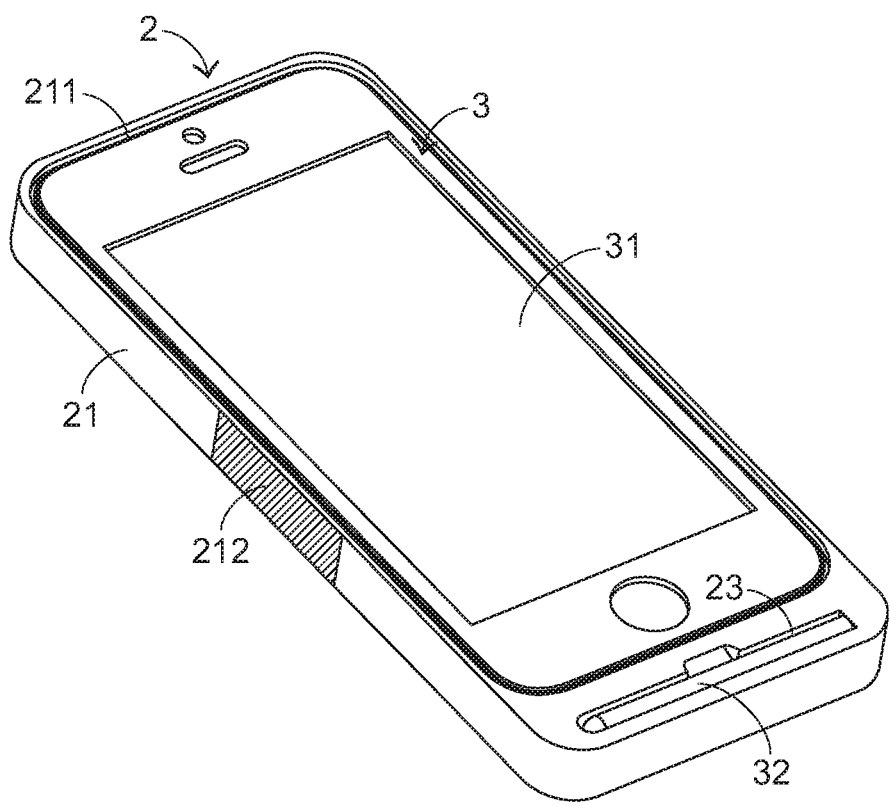
FIG. 4 is a schematic exploded view illustrating the protecting device, the electronic device and the peripheral component as shown in FIG. 3, in which the electronic device and the peripheral component are accommodated within the protecting device.

Please refer to FIGS. 3 and 4. FIG. 3 is a schematic exploded view illustrating the relationship between a protecting device, an electronic device and a peripheral component according to a first embodiment of the present invention. FIG. 4 is a schematic exploded view illustrating the protecting device, the electronic device and the peripheral component as shown in FIG. 3, in which the electronic device and the peripheral component are accommodated within the protecting device. In FIGS. 3 and 4, a protecting device 2, an electronic device 3 and a peripheral component 32 are shown. The protecting device 2 comprises a casing 21, a first electrical connection component 22, a second accommodating part 23, a second electrical connection component 24, and an energy storage element 25. The electronic device 3 comprises a display screen 31. The casing 21 has a first accommodating part 211 for accommodating the display screen 31 of the electronic device 3, wherein the display screen 31 of the electronic device 3 is exposed outside. The shape of the first accommodating part 211 matches the outer profile of the electronic device 3. In this embodiment, the electronic device 3 is a smart phone, and the display screen 31 is a touch screen. Alternatively, in some other embodiments, the electronic device is a tablet personal computer, a personal digital assistant or a handheld game console.

In the protecting device 2, the first electrical connection component 22 is disposed within the first accommodating part 211. When the first electrical connection component 22 is contacted with the electronic device 3, the first electrical connection component 22 is electrically connected with the electronic device 3. The second accommodating part 23 is disposed in the casing 21 for accommodating the peripheral component 32. The shape of the second accommodating part 23 matches the outer profile of the peripheral component 32. The second electrical connection component 24 is disposed within the second accommodating part 23. When the second electrical connection component 24 is contacted with the peripheral component 32, the second electrical connection component 24 is electrically connected with the peripheral component 32. The energy storage element 25 is disposed within the casing 21. Moreover, the energy storage element 25 is connected with the first electrical connection component 22 and the second electrical connection component 24 for providing electric power to the first electrical connection component 22 or the second electrical connection component 24. In this embodiment, the first accommodating part 211 is a storing space, and the second accommodating part 23 is a storing recess. The first electrical connection component 22 and the second electrical connection component 24 are metallic contacts. The peripheral component 32 is an active stylus that is driven by electric power. The energy storage element 25 is a portable power source (also referred as a power bank). Alternatively, in some other embodiments, the second accommodating part is a storing ring or an engaging structure, the peripheral component is a laser pointer or a remote presentation controller, and the energy storage element is a chargeable battery.

In FIG. 3, the energy storage element 25 further comprises a connecting port (not shown). The connecting port is exposed outside the casing 21. When a power cable (not shown) connected with a power supply source (not shown) is plugged into the connecting port, the energy storage element 25 is electrically connected with the power supply source for receiving electric power from the power supply source. Consequently, the energy storage element 25 is charged by the electric power.

When the user wants to use the electronic device 3, since the display screen 31 of the electronic device 3 within the first accommodating part 211 is exposed outside, the display screen 31 may be operated by the user's finger directly or operated by the peripheral component 32. Under this circumstance, the operations of the electronic device 3 can be correspondingly controlled. At the same time, since the electronic device 3 is partially covered by the protecting device 2, the electronic device 3 is protected by the protecting device 2. Moreover, since the electronic device 3 within the first accommodating part 211 is contacted with the first electrical connection component 22, the electric connection between the electronic device 3 and the energy storage element 25 is established through the first electrical connection component 22. In case that the electricity quantity of a chargeable battery (not shown) of the electronic device 3 is insufficient, the user may push a control button (not shown) outside the casing 21 to drive the energy storage element 25 to output the electric power to the first electrical connection component 22, thereby charging the electronic device 3. Alternatively, in some other embodiments, the control button is not included in the protecting device 2. Under this circumstance, when the first electrical connection component is contacted with the electronic device, the electric power is transmitted to the electronic device immediately.

After the peripheral component 32 is no longer used, the peripheral component 32 may be accommodated within the second accommodating part 23. Meanwhile, the peripheral component 32 is contacted with the second electrical connection component 24 within the second accommodating part 23, so that the peripheral component 32 is electrically connected with the energy storage element 25. Under this circumstance, the electric power is transmitted from the energy storage element 25 to the second electrical connection component 24, thereby charging the peripheral component 32.

Figure 5:
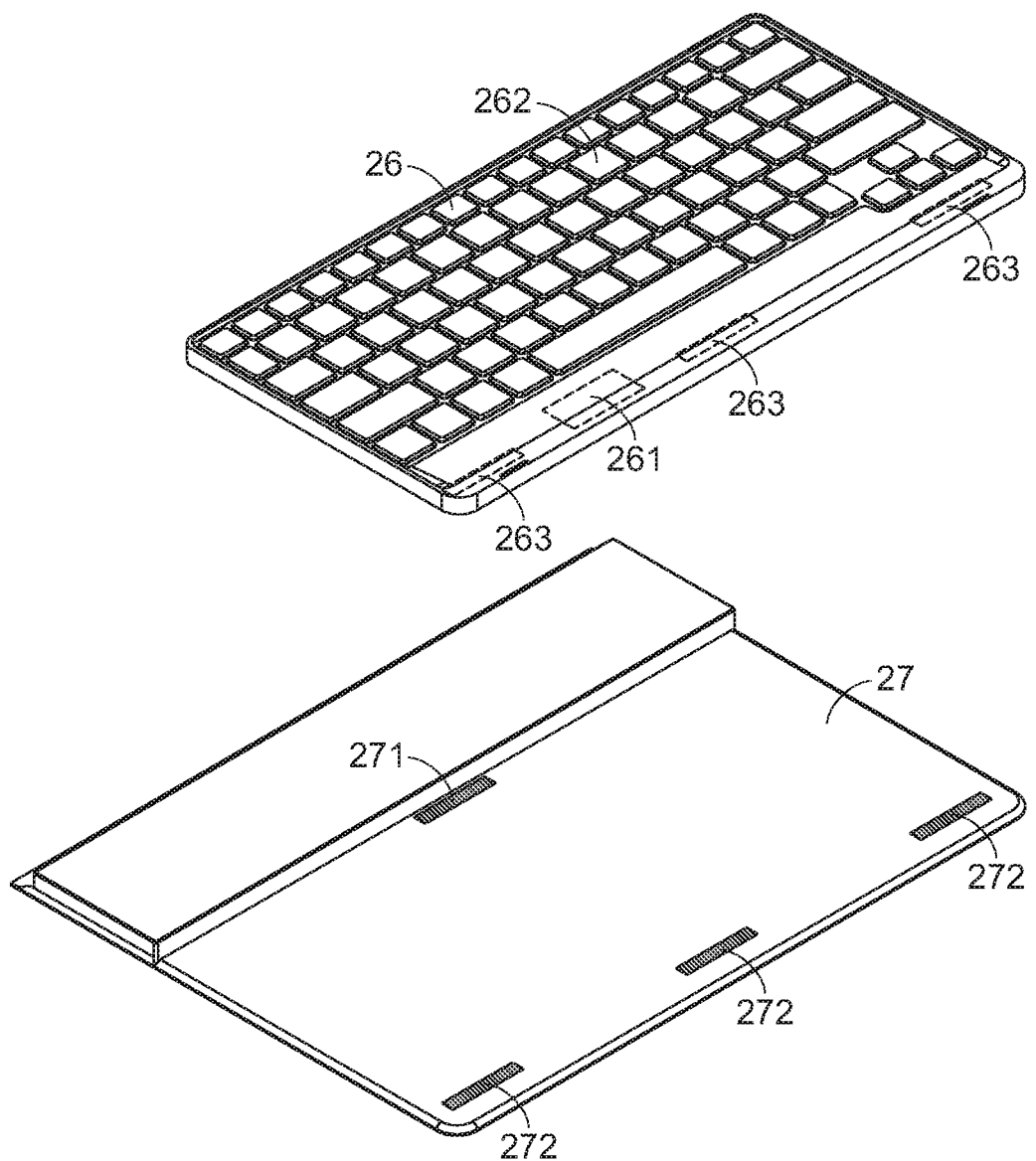
FIG. 5 is a schematic exploded view illustrating a supporting base and a keyboard of the protecting device according to the first embodiment of the present invention.

Next, please refer to FIGS. 3 and 5. FIG. 5 is a schematic exploded view illustrating a supporting base and a keyboard of the protecting device according to the first embodiment of the present invention. As shown in FIG. 3, the casing 21 further comprises a third electrical connection component 212. The third electrical connection component 212 is located at a first side of the casing 21 for transmitting the electric power from the energy storage element 25. As shown in FIG. 5, the protecting device 2 further comprises a keyboard 26 and a supporting base 27. The keyboard 26 comprises a wireless transmission module 261, plural keys 262, and plural fifth electrical connection components 263. The keyboard 26 is in communication with the electronic device 3 through the wireless transmission module 261. Via the keyboard 26, at least one symbol or at least one command may be inputted into the electronic device 3. The plural keys 262 are disposed on the keyboard 26, and exposed to a top surface of the keyboard 26. When one of the plural keys 262 is depressed, the corresponding symbol or command is generated. The plural fifth electrical connection components 263 are disposed on a bottom surface of the keyboard 26 to be electrically connected with the supporting base 27.

The supporting base 27 is used for supporting the keyboard 26 thereon. Moreover, the supporting base 27 comprises a fourth electrical connection component 271 and plural sixth electrical connection components 272. The fourth electrical connection component 271 is located at a second side of the supporting base 27. When the fourth electrical connection component 271 is contacted with the third electrical connection component 212 of the casing 21, the fourth electrical connection component 271 is electrically connected with the third electrical connection component 212, so that the electric power from the energy storage element 25 is transmitted to the keyboard 26. The plural sixth electrical connection components 272 are located at a first side of the supporting base 27. When the plural sixth electrical connection components 272 are contacted with the plural fifth electrical connection components 263 of the keyboard 26, the plural sixth electrical connection components 272 are electrically contacted with the plural fifth electrical connection components 263, so that the electric power is transmitted to the keyboard 26. In this embodiment, the third electrical connection component 212, the fourth electrical connection component 271, the fifth electrical connection components 263 and the sixth electrical connection components 272 are all resilient metallic sheets, and the wireless transmission module 261 is a Bluetooth transmission module. Consequently, the user can input the symbol or command into the electronic device 3 via the keyboard 26 in order to control the electronic device 3.

After the electric power is acquired by the keyboard 26, the keyboard 26 is enabled. For operating the keyboard 26 to control the electronic device 3, the casing 21 and the supporting base 27 should be connected with each other. That is, after the third electrical connection component 212 of the casing 21 is electrically connected with the fourth electrical connection component 271 of the supporting base 27, the electrical connection between the energy storage element 25 and the keyboard 26 is established. Consequently, the electric power can be transmitted from the energy storage element 25 to the keyboard 26, thereby driving the keyboard 26.

From the above discussions about the protection device of the present invention, the energy storage element is disposed within the casing for charging the electronic device that is accommodated within the first accommodating part or charging the peripheral component that is accommodated within the second accommodating part. Moreover, the electric power may be transmitted from the energy storage element to the keyboard through the third electrical connection component and the fourth electrical connection component. Since the energy storage element is disposed within the casing, the energy storage element will not be detached from the casing during the charging operation is performed. Moreover, since the energy storage element is in communication with the electronic device, the peripheral component and the keyboard without the need of using physical connecting wires, the problem of carelessly pulling out the connecting wires from the protecting device when the electronic device, the peripheral component or the keyboard is charged by the protection device will be overcome. Consequently, the charging operation will be interrupted.

Figure 6:
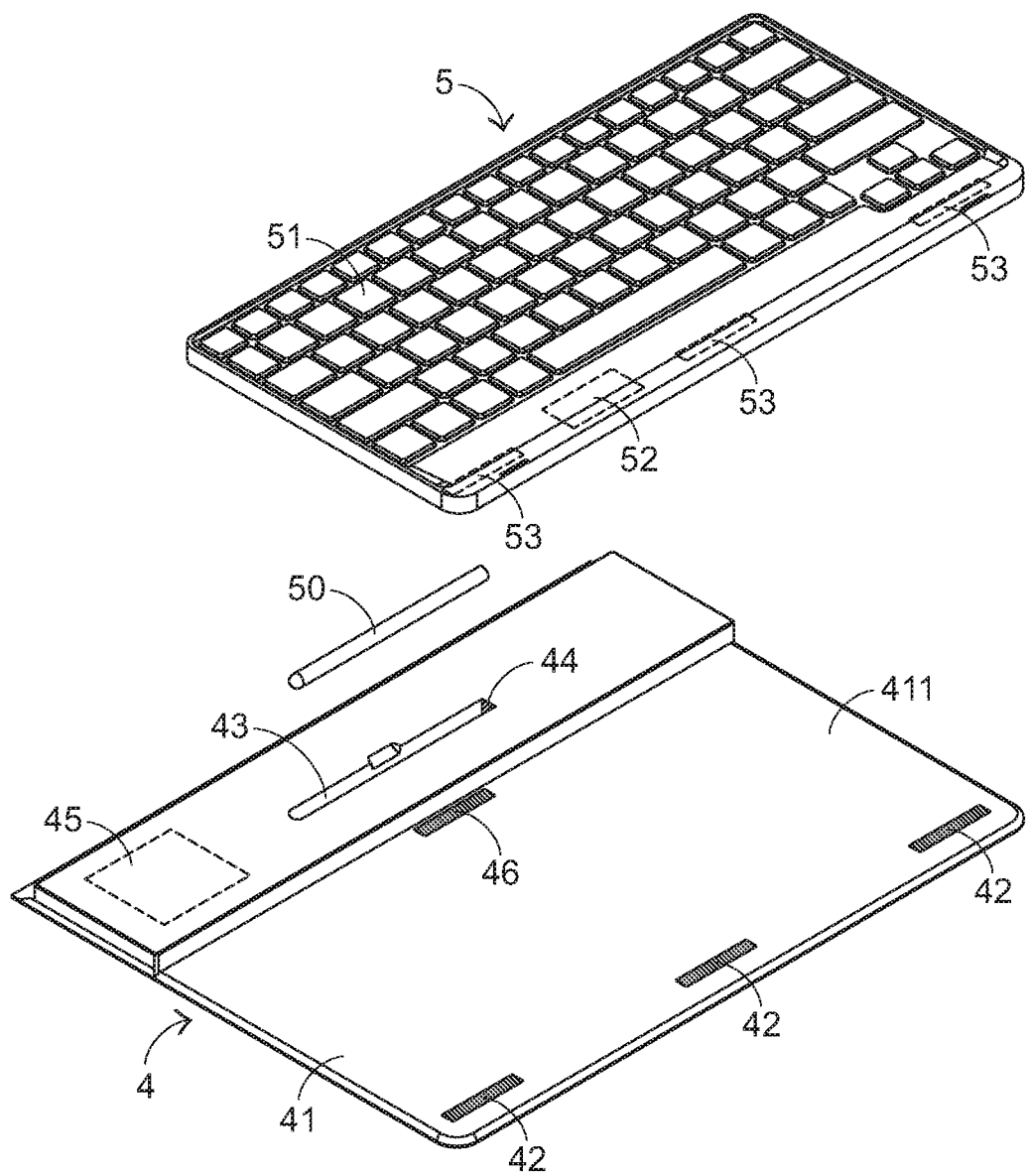
FIG. 6 is a schematic exploded view illustrating the relationship between a protecting device, an electronic device and a peripheral component according to a second embodiment of the present invention.

Hereinafter, a protection device for an electronic device according to a second embodiment of the present invention will be illustrated with reference to FIG. 6. FIG. 6 is a schematic exploded view illustrating the relationship between a protecting device, an electronic device and a peripheral component according to a second embodiment of the present invention. The protecting device 4 comprises a casing 41, plural first electrical connection components 42, a second accommodating part 43, a second electrical connection component 44, an energy storage element 45, and a third electrical connection component 46. The electronic device 5 comprises plural keys 51, a wireless transmission module 52, and plural fourth electrical connection components 53. The plural keys 51 are disposed on the electronic device 5, and exposed to a top surface of the electronic device 5. When one of the plural keys 51 is depressed, the corresponding symbol or command is generated. The casing 41 is used for partially covering the electronic device 5. The casing 41 has a first accommodating part 411 for accommodating the electronic device 5, wherein the plural keys 51 of the electronic device 5 are exposed outside. The shape of the first accommodating part 411 matches the outer profile of the electronic device 5. In this embodiment, the electronic device 5 is a keyboard, the first accommodating part 411 is a storing space, and the second accommodating part 43 is a storing recess.

In the protecting device 4, the plural first electrical connection components 42 are disposed within the first accommodating part 411. When the plural first electrical connection components 42 are contacted with the plural fourth electrical connection components 53 of the electronic device 5, the plural first electrical connection components 42 are electrically connected with the electronic device 5. The second accommodating part 43 is disposed in the casing 41 for accommodating a peripheral component 50. The shape of the second accommodating part 43 matches the outer profile of the peripheral component 50. The second electrical connection component 44 is disposed within the second accommodating part 43. When the second electrical connection component 44 is contacted with the peripheral component 50, the second electrical connection component 44 is electrically connected with the peripheral component 50. The energy storage element 45 is disposed within the casing 41. Moreover, the energy storage element 45 is connected with the plural first electrical connection component 42 and the second electrical connection component 44 for providing electric power to the plural first electrical connection component 42 or the second electrical connection component 44. In this embodiment, the plural first electrical connection component 42 and the second electrical connection component 44 are metallic contacts. The peripheral component 50 is a laser pointer that is driven by electric power. The energy storage element 45 is a chargeable battery.

When the user wants to operate the electronic device 5 to control an additional electronic device (e.g. a tablet personal computer), the wireless transmission module 52 within the electronic device 5 should be in communication with the additional electronic computer. After the communication between the electronic device 5 and the additional electronic device is established, the user may depress one of the plural keys 51 to input a symbol or a command. On the other hand, the additional electronic device further comprises a fifth electrical connection component (not shown). When the additional electronic device is placed on the casing 41, the fifth electrical connection component is contacted with the third electrical connection component 46 of the casing 41. Consequently, the electrical connection between the additional electronic device and the protection device 4 is established, and the electric power can be transmitted from the energy storage element 45 to the additional electronic device. In this embodiment, the third electrical connection component 46, the plural fourth electrical connection components 53 and the fifth electrical connection component are all resilient metallic sheets.

From the above discussions, after the electronic device 5 is placed within the first accommodating part 411, the electronic device 5 is contacted with the plural first electrical connection component 42, and thus the electronic device 5 is electrically connected with the energy storage element 45 to acquire the electric power. On the other hand, after the peripheral component 50 is placed within the second accommodating part 43, the peripheral component 5 is contacted with the second electrical connection component 44, and thus the energy storage element 45 is electrically connected with the peripheral component 50 to charge the peripheral component 50.

Figure 7:
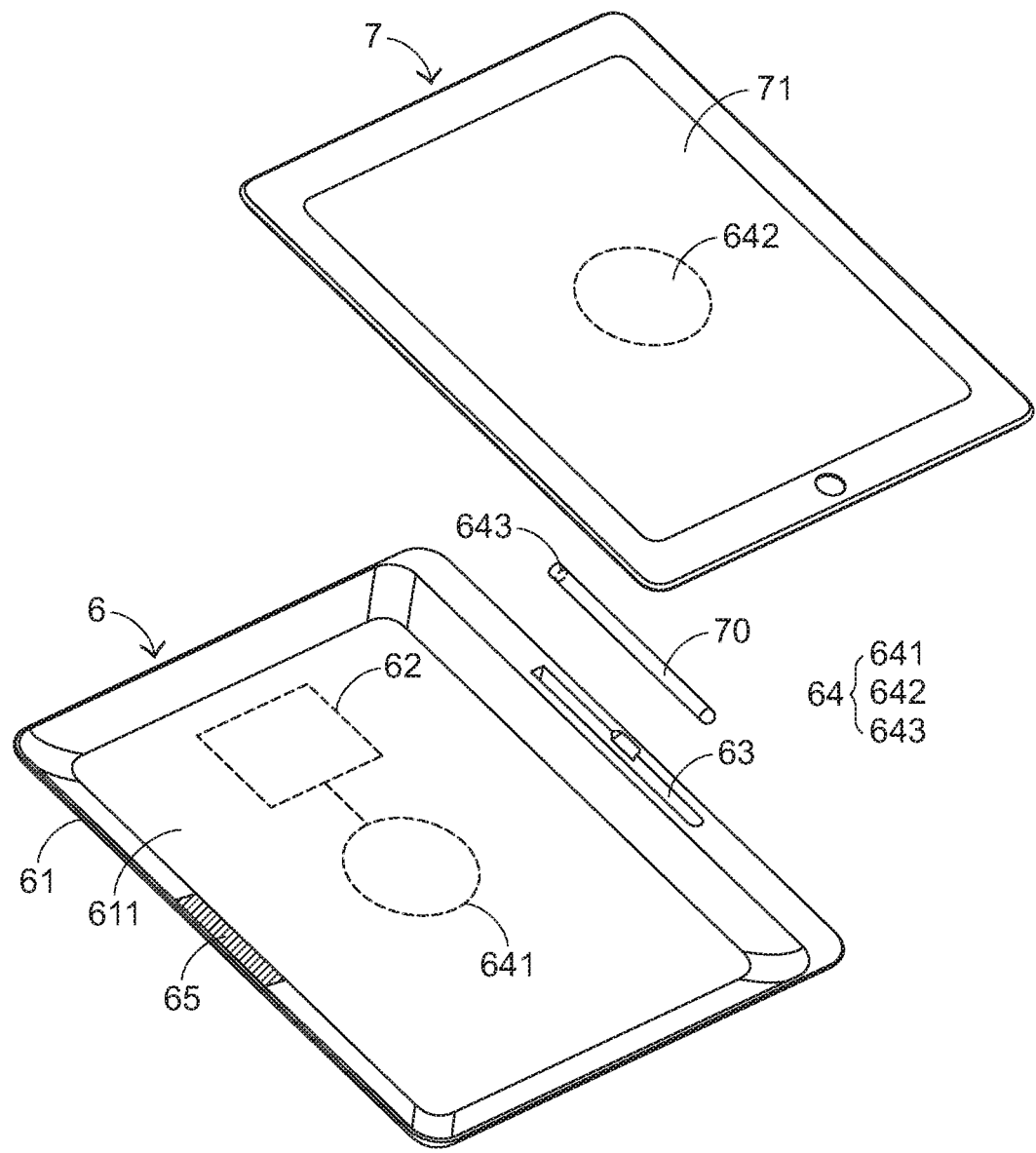
FIG. 7 is a schematic exploded view illustrating the relationship between a protecting device, an electronic device and a peripheral component according to a third embodiment of the present invention.
Figure 8:
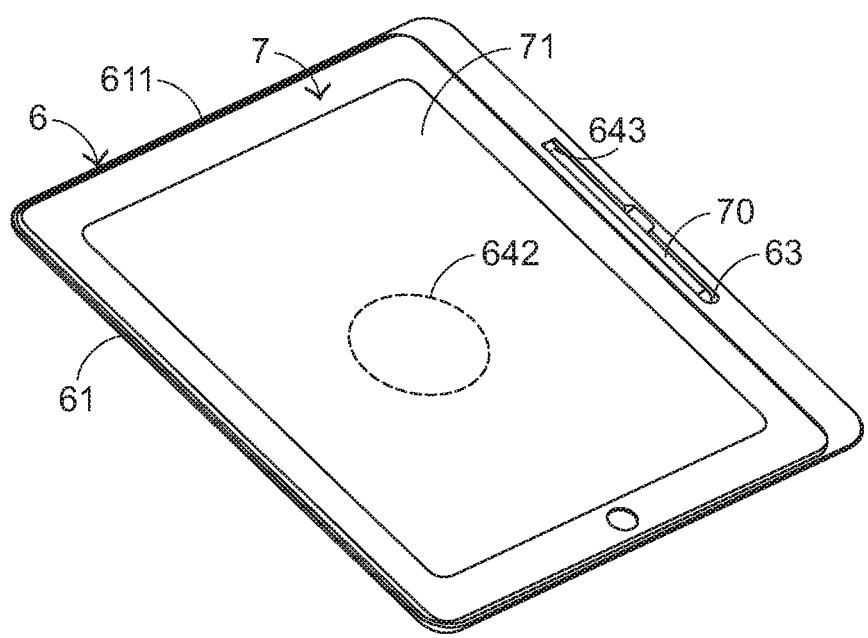
FIG. 8 is a schematic exploded view illustrating the protecting device, the electronic device and the peripheral component as shown in FIG. 7, in which the electronic device and the peripheral component are accommodated within the protecting device.

Hereinafter, a protection device for an electronic device according to a third embodiment of the present invention will be illustrated with reference to FIGS. 7 and 8. FIG. 7 is a schematic exploded view illustrating the relationship between a protecting device, an electronic device and a peripheral component according to a third embodiment of the present invention. FIG. 8 is a schematic exploded view illustrating the protecting device, the electronic device and the peripheral component as shown in FIG. 7, in which the electronic device and the peripheral component are accommodated within the protecting device. In FIGS. 7 and 8, a protecting device 6, an electronic device 7 and a peripheral component 70 are shown. The protecting device 6 comprises a casing 61, an energy storage element 62, a second accommodating part 63, and a wireless charging module 64. The electronic device 7 comprises a display screen 71. In this embodiment, the electronic device 7 is a tablet personal computer, and the display screen 71 is a touch screen. Moreover, the peripheral component 70 is an active stylus, the first accommodating part 611 is a storing space, and the second accommodating part 63 is a storing recess.

The casing 61 is used for partially covering the electronic device 7. The casing 61 has a first accommodating part 611 for accommodating the electronic device 7, wherein the display screen 71 of the electronic device 7 is exposed outside. The shape of the first accommodating part 611 matches the outer profile of the electronic device 7. The energy storage element 62 is disposed within the casing 61 for providing electric power. The second accommodating part 63 is disposed in the casing 61 for accommodating the peripheral component 70. The shape of the second accommodating part 63 matches the outer profile of the peripheral component 70. The wireless charging module 64 is connected with the energy storage element 62. In response to the electric power from the energy storage element 62, the electronic device 7 within the first accommodating part 611 is wirelessly charged by the wireless charging module 64, or the peripheral component 70 within the second accommodating part 63 is wirelessly charged by the wireless charging module 64.

As shown in FIG. 7, the wireless charging module 64 comprises a transmitter coil 641, a first receiver coil 642, and a second receiver coil 643. The transmitter coil 641 is disposed within the casing 61, and connected with the energy storage element 62. In response to the electric power from the energy storage element 62, the transmitter coil 641 results in an electromagnetic effect. The first receiver coil 642 is disposed within the electronic device 7. In response to the electromagnetic effect of the transmitter coil 641, the first receiver coil 642 generates a first output electric power. The first output electric power is transmitted to the electronic device 7 within the first accommodating part 611 so as to wirelessly charge the electronic device 7. The second receiver coil 643 is disposed within the peripheral component 70. In response to the electromagnetic effect, the second receiver coil 643 generates a second output electric power. The second output electric power is transmitted to the peripheral component 70 within the second accommodating part 63 so as to wirelessly charge the peripheral component 70.

Please refer to FIG. 7 again. The energy storage element 62 may further comprise a power cable (not shown). The power cable may be protruded out of the casing 61 or accommodated within the casing 61. When the power cable is connected with a power supply source (not shown), the energy storage element is electrically connected with the power supply source. Consequently, the electric power from the power supply source is received by the power cable in order to charge the energy storage element 62. Moreover, the power cable may be pulled out of the casing 61 through a hub (not shown) that is disposed within the casing 61. Alternatively, the power cable may be accommodated within the casing 61 through the hub. The structure and the operating principle of the hub are well known to those skilled in the art, and are not redundantly described herein. Alternatively, the casing 61 may further comprises an additional second accommodating part (not shown), and the folded power cable may be accommodated within the additional second accommodating part.

Like the first embodiment, the protecting device 7 may further comprise a keyboard (not shown) and a supporting base (not shown). The supporting base comprises a second electrical connection component (not shown). The second electrical connection component is located at a second side of the supporting base. When the second electrical connection component is contacted with a first electrical connection component 65 of the casing 61, the second electrical connection component is electrically connected with the first electrical connection component 65, so that the electric power from the energy storage element 62 is transmitted to the keyboard. The structures and the operating principles of the keyboard and the supporting base are similar to those of the first embodiment, and are not redundantly described herein.

When the user wants to use the electronic device 7, since the display screen 71 of the electronic device 7 within the first accommodating part 611 is exposed outside, the display screen 71 may be operated by the user's finger directly or operated by the peripheral component 70. Under this circumstance, the operations of the electronic device 7 can be correspondingly controlled. At the same time, since the electronic device 7 is partially covered by the protecting device 6, the electronic device 7 is protected by the protecting device 6. Since the electronic device 7 within the first accommodating part 611 is near the transmitter coil 641, the first receiver coil 642 within the electronic device 7 generates a first output electric power in response to the electromagnetic effect of the transmitter coil 641. The first output electric power is transmitted to the electronic device 7, so that the electronic device 7 is wirelessly charged by the energy storage element 62. After the peripheral component 70 is no longer used, the peripheral component 70 may be accommodated within the second accommodating part 63. Meanwhile, since the second receiver coil 643 within the peripheral component 70 is near the transmitter coil 641, the second receiver coil 643 generates a second output electric power in response to the electromagnetic effect of the transmitter coil 641. The second output electric power is transmitted to the peripheral component 70, so that the peripheral component 70 is wirelessly charged by the energy storage element 62.

Figure 9:
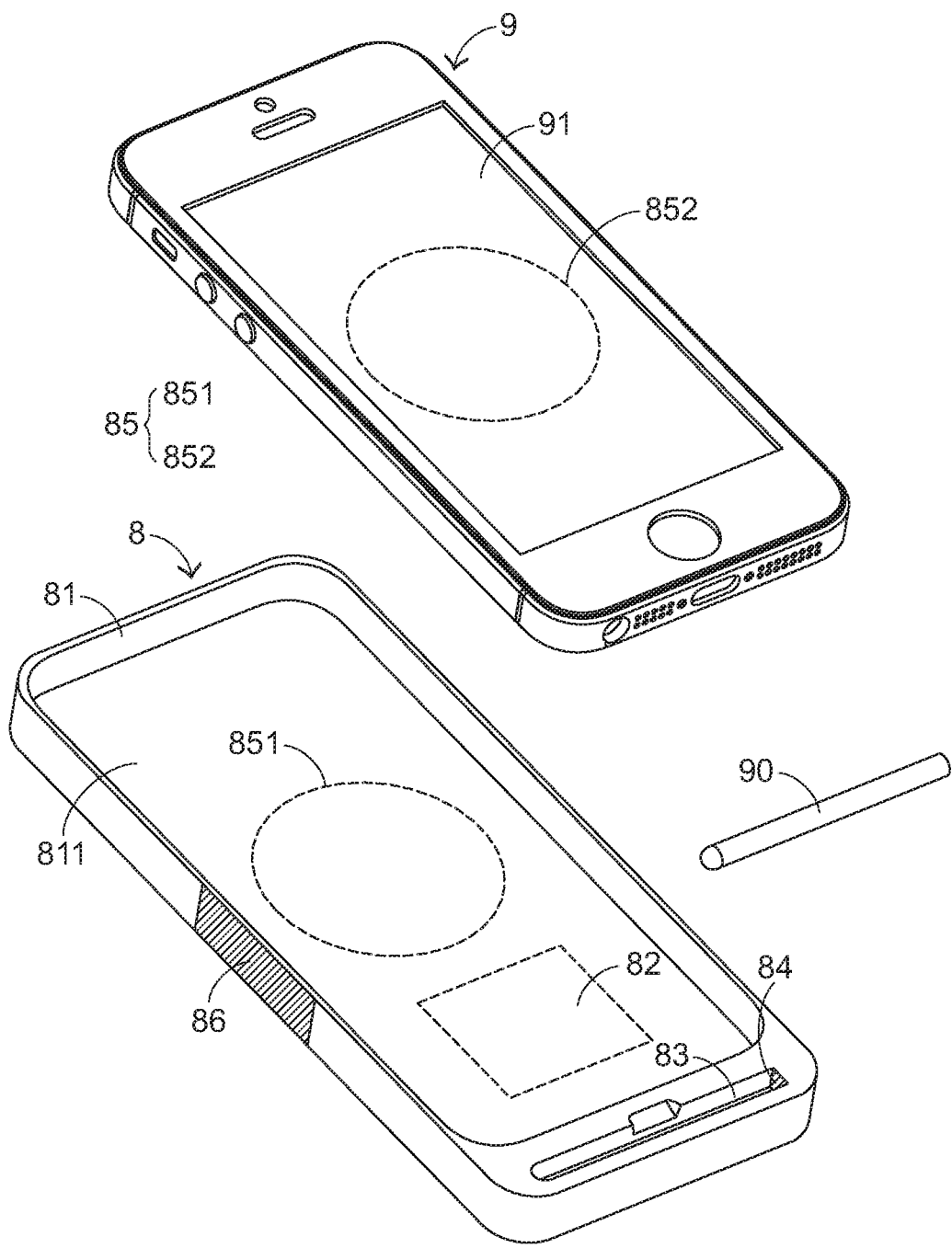
FIG. 9 is a schematic exploded view illustrating the relationship between a protecting device, an electronic device and a peripheral component according to a fourth embodiment of the present invention.

Hereinafter, a protection device for an electronic device according to a fourth embodiment of the present invention will be illustrated with reference to FIG. 9. FIG. 9 is a schematic exploded view illustrating the relationship between a protecting device, an electronic device and a peripheral component according to a fourth embodiment of the present invention. In FIG. 9, a protecting device 8, an electronic device 9 and a peripheral component 90 are shown. The protecting device 8 comprises a casing 81, an energy storage element 82, a second accommodating part 83, a first electrical connection component 84, and a wireless charging module 85. The electronic device 9 comprises a display screen 91. In this embodiment, the electronic device 9 is a smart phone, and the display screen 91 is a touch screen. Moreover, the peripheral component 90 is a laser pointer, and the second accommodating part 83 is a storing recess.

As shown in FIG. 9, the casing 81 is used for partially covering the electronic device 9. The casing 81 has a first accommodating part 811 for accommodating the electronic device 9, wherein the display screen 91 of the electronic device 9 is exposed outside. The shape of the first accommodating part 811 matches the outer profile of the electronic device 9. The energy storage element 82 is disposed within the casing 81 for providing electric power. The second accommodating part 83 is disposed in the casing 81 for accommodating the peripheral component 90. The shape of the second accommodating part 83 matches the outer profile of the peripheral component 90. The first electrical connection component 84 is disposed within the second accommodating part 83. When the first electrical connection component 84 is contacted with the peripheral component 90, the first electrical connection component 84 is electrically connected with the peripheral component 90. The wireless charging module 85 is connected with the energy storage element 82. In response to the electric power from the energy storage element 82, the electronic device 9 within the first accommodating part 811 is wirelessly charged by the wireless charging module 85. In this embodiment, the first accommodating part 811 is a storing space, the energy storage element 82 is a portable power source, and the first electrical connection component 84 is a metallic contact.

The wireless charging module 85 comprises a transmitter coil 851 and a receiver coil 852. The transmitter coil 851 is disposed within the casing 81, and connected with the energy storage element 82. In response to the electric power from the energy storage element 82, the transmitter coil 851 results in an electromagnetic effect. The receiver coil 852 is disposed within the electronic device 9. In response to the electromagnetic effect, the receiver coil 852 generates an output electric power. The output electric power is transmitted to the electronic device 9 within the first accommodating part 811 so as to wirelessly charge the electronic device 9.

That is, the electronic device 9 within the first accommodating part 811 is wirelessly charged by the energy storage element 82 through the wireless charging module 85, or the peripheral component 90 within the second accommodating part 83 is charged by the energy storage element 82 through the first electrical connection component 84.

In FIG. 9, the energy storage element 82 further comprises a connecting port (not shown). The connecting port is exposed outside the casing 81. When a power cable (not shown) connected with a power supply source (not shown) is plugged into the connecting port, the energy storage element 82 is electrically connected with the power supply source for receiving electric power from the power supply source. Consequently, the energy storage element 82 is charged by the electric power.

Like the first embodiment, the protecting device 9 may further comprise a keyboard (not shown) and a supporting base (not shown). The supporting base comprises a third electrical connection component (not shown). The third electrical connection component is located at a second side of the supporting base. When the second electrical connection component is contacted with a second electrical connection component 86 of the casing 81, the third electrical connection component is electrically connected with the second electrical connection component 86, so that the electric power from the energy storage element 82 is transmitted to the keyboard. The structures and the operating principles of the keyboard and the supporting base are similar to those of the first embodiment, and are not redundantly described herein.

When the user wants to use the electronic device 9, since the display screen 91 of the electronic device 9 within the first accommodating part 811 is exposed outside, the display screen 91 may be operated by the user's finger directly or operated by the peripheral component 90. Under this circumstance, the operations of the electronic device 9 can be correspondingly controlled. At the same time, since the electronic device 9 is partially covered by the protecting device 8, the electronic device 9 is protected by the protecting device 8. Since the electronic device 9 within the first accommodating part 811 is near the transmitter coil 851, in response to the electric power from the energy storage element 82, the receiver coil 852 within the electronic device 9 correspondingly generates an output electric power. Consequently, the electronic device 9 is wirelessly charged by the energy storage element 82. After the peripheral component 90 is no longer used, the peripheral component 90 may be accommodated within the second accommodating part 83. Meanwhile, the peripheral component 90 is contacted with the second electrical connection component 86 within the second accommodating part 83, so that the electrical connection between the peripheral component 90 and the energy storage element 92 is established through the second electrical connection component 86. Consequently, the peripheral component 90 is wirelessly charged by the energy storage element 82.

It is noted that numerous modifications and alterations may be made while retaining the teachings of the invention. For example, in another embodiment, the protecting device for an electronic device comprises a casing, an energy storage element, a second accommodating part, a first electrical connection component, and a wireless charging module. In comparison with the fourth embodiment, the first electrical connection component is disposed within a first accommodating part of the casing, and a receiver coil of the wireless charging module is disposed within the casing and located near the second accommodating part. That is, the peripheral component within the second accommodating part is wirelessly charged by the protecting device in a wireless charging manner, and the electronic device within the first accommodating part is charged by the protecting device in a wired charging manner. The other components of the protecting device of this embodiment are similar to those of the protecting device of the fourth embodiment, and are not redundantly described herein.

From the above descriptions, the present invention provides a protecting device for an electronic device. An energy storage element is disposed within a casing for charging an electronic device within a first accommodating part or a peripheral component within a second accommodating part. On the other hand, electric power may be transmitted from the energy storage element to a keyboard through electrical connection components. Since the energy storage element is fixed within the casing and integrated into the casing, the energy storage element will not be detached from the casing. Moreover, since the electronic device or the peripheral component is charged by the energy storage element without the need of using physical connecting wires, the problem of carelessly dropping off the energy storage element or pulling out the connecting wires during the charging process will be overcome. Moreover, since the electronic device and the peripheral component can be simultaneously accommodated within the protecting device, the electronic device and the peripheral component can be carried more easily. Under this circumstance, the possibility of losing the peripheral component will be minimized.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A protecting device for an electronic device, said protecting device comprising:

a casing for partially covering said electronic device, wherein said casing has a first accommodating part for accommodating said electronic device, wherein when said electronic device is accommodated within said first accommodating part, a display screen of said electronic device is exposed outside;

an energy storage element disposed within said casing for providing electric power;

a second accommodating part disposed in said casing for accommodating a peripheral component; and a wireless charging module connected with said energy storage element, wherein in response to said electric power, said electronic device within said first accommodating part is wirelessly charged by said wireless charging module, and said peripheral component within said second accommodating part is wirelessly charged by said wireless charging module, wherein when said peripheral component is accommodated within said second accommodating part, said peripheral component is wirelessly charged by said wireless charging module.

2. The protecting device according to claim 1, wherein said wireless charging module comprises:

a transmitter coil disposed within said casing and connected with said energy storage element, wherein said transmitter coil results in an electromagnetic effect in response to said electric power;

a first receiver coil disposed within said electronic device, wherein said first receiver coil generates a first output electric power in response to said electromagnetic effect, wherein said first output electric power is transmitted to said electronic device within said first accommodating part so as to wirelessly charge said electronic device; and a second receiver coil disposed within said peripheral component, wherein said second receiver coil generates a second output electric power in response to said electromagnetic effect, wherein said second output electric power is transmitted to said peripheral component within said second accommodating part so as to wirelessly charge said peripheral component.

3. The protecting device according to claim 1, wherein said energy storage element comprises a connecting port, and said connecting port is exposed outside said casing, wherein when a power cable connected with a power supply source is plugged into said connecting port, said energy storage element is electrically connected with said power supply source.

4. The protecting device according to claim 1, wherein said energy storage element comprises a power cable, and said power cable is protruded out of said casing or accommodated within said casing, wherein when said power cable is connected with a power supply source, said energy storage element is electrically connected with said power supply source.

5. The protecting device according to claim 1, wherein said energy storage element is a portable power source or a chargeable battery, said electronic device is a tablet personal computer, a smart phone, a personal digital assistant, a handheld game console or a keyboard, and said peripheral component is an active stylus, a laser pointer or a remote presentation controller.

6. The protecting device according to claim 1, further comprising:

a keyboard in communication with said electronic device for inputting at least one symbol or at least one command into said electronic device; and a supporting base for supporting said keyboard thereon.

7. The protecting device according to claim 6, wherein said casing further comprises a first electrical connection component, and said first electrical connection component is located at a first side of said casing and connected with said energy storage element for transmitting said electric power, wherein said supporting base further comprises a second electrical connection component, and said second electrical connection component is located at a second side of said supporting base, wherein when said second electrical connection component is contacted with and electrically connected with said first electrical connection component, said electric power from said energy storage element is transmitted to said keyboard through said first electrical connection component and said second electrical connection component.

* * * * *